United States Patent
Duplys et al.

(10) Patent No.: US 10,169,612 B2
(45) Date of Patent: Jan. 1, 2019

(54) METHOD FOR EXECUTING A SAFETY-CRITICAL FUNCTION OF A COMPUTING UNIT IN A CYBER-PHYSICAL SYSTEM

(71) Applicant: Robert Bosch GmbH, Stuttgart (DE)

(72) Inventors: Paulius Duplys, Markgroeningen (DE); Christopher Huth, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 158 days.

(21) Appl. No.: 15/139,161

(22) Filed: Apr. 26, 2016

(65) Prior Publication Data

US 2016/0328571 A1 Nov. 10, 2016

(30) Foreign Application Priority Data

May 7, 2015 (DE) .................. 10 2015 208 510

(51) Int. Cl.
*G06F 21/62* (2013.01)
*H04L 29/06* (2006.01)
*G06F 21/31* (2013.01)

(52) U.S. Cl.
CPC ............ *G06F 21/629* (2013.01); *H04L 63/10* (2013.01); *G06F 21/31* (2013.01)

(58) Field of Classification Search
CPC ... H04L 63/10; H04L 63/1441; G06F 21/629; G06F 21/31
USPC ............................................... 726/26–19, 31
See application file for complete search history.

(56) References Cited

U.S. PATENT DOCUMENTS

| | | | |
|---|---|---|---|
| 8,516,269 B1 * | 8/2013 | Hamlet | G06F 21/445 340/5.8 |
| 8,868,923 B1 * | 10/2014 | Hamlet | G06F 21/00 326/8 |
| 9,119,068 B1 * | 8/2015 | Hubble | H04W 12/06 |
| 9,755,841 B2 * | 9/2017 | Chen | H04L 9/3278 |
| 2013/0044874 A1 * | 2/2013 | Murray | H04L 9/0866 380/44 |
| 2014/0068780 A1 * | 3/2014 | Kim | G06F 21/88 726/26 |
| 2014/0331302 A1 * | 11/2014 | Rouchouze | G07D 7/004 726/9 |
| 2015/0095984 A1 * | 4/2015 | Adsule | H04L 63/083 726/4 |
| 2016/0149881 A1 * | 5/2016 | Rengan | H04L 63/107 726/7 |
| 2017/0346644 A1 * | 11/2017 | Cambou | H04L 63/08 |

\* cited by examiner

*Primary Examiner* — Jahangir Kabir
(74) *Attorney, Agent, or Firm* — Norton Rose Fulbright US LLP; Gerard Messina

(57) ABSTRACT

A method for executing a safety-critical function of a computing unit in a cyber-physical system, a request being received for the execution of the safety-critical function, an environment-specific and/or user-specific measurement value being acquired by at least one sensor of the computing unit, the environment-specific measurement value describing an environment of the computing unit, the user-specific measurement value describing an interaction of a user with the computing unit, the safety-critical function being executed if the environment-specific and/or the user-specific measurement value fulfills a specified criterion.

16 Claims, 3 Drawing Sheets

METHOD FOR EXECUTING A SAFETY-CRITICAL FUNCTION OF A COMPUTING UNIT IN A CYBER-PHYSICAL SYSTEM

CROSS REFERENCE

The present application claims the benefit under 35 U.S.C. § 119 of German Patent Application No. DE 102015208510.4 filed on May 7, 2015, which is expressly incorporated herein by reference in its entirety.

FIELD

The present invention relates to a method for executing a safety-critical function of a computing unit in a cyber-physical system, as well as to a computing unit and a computer program for carrying out the method.

BACKGROUND INFORMATION

Cyber-physical systems (CPS) are conventional. Here, various informatic, software-related, hardware-related, mechanical, and/or electronic components are networked with one another, for example via the Internet. In this way, the components can make use of data and services that are available worldwide. Cyber-physical systems can use sensors to acquire physical data and can use actuators to act on physical processes. Components in cyber-physical systems often carry out safety-critical functions, for example in order to authenticate components or to create cryptographic keys.

SUMMARY

According to the present invention, a method is proposed for executing a safety-critical function of a computing unit in a cyber-physical system, as well as a computing unit and a computer program for carrying out the method. Advantageous example embodiments are described below.

In the course of the method, a request is received for the execution of the safety-critical function. This request can for example be made by another already-executed function of the computing unit, or by a further computing unit or component of the cyber-physical system.

An environment-specific and/or user-specific measurement value is acquired by at least one sensor of the computing unit. The environment-specific measurement value describes an environment or environmental conditions of the computing unit. In particular, environment-specific measurement values described physical quantities of the environment, such as a temperature, air humidity, brightness. For this purpose, the sensor can be fashioned for example as a temperature sensor, an infrared transceiver, an ultrasound transceiver.

The user-specific measurement value describes an interaction of a user with the computing unit. For this purpose, the sensor can for example be fashioned as an acceleration sensor, a camera, a touch sensor or touchpad.

The safety-critical function is executed in response to the request if the environment-specific and/or the user-specific measurement value fulfills a specified criterion. If this is not the case, the execution of the function is prevented.

In particular, a plurality of different environment-specific and/or user-specific measurement values can also be acquired. In this case, the safety-critical function is executed in response to the request for example only if in particular each of these measurement values respectively fulfills a specified criterion, or if in particular all these measurement values fulfill a common specified criterion.

A safety-critical function is to be understood as a process or an operation in the course of which safety-critical data are processed and/or created, such as signatures, encryptions, etc. For the safe, efficient operation of the computing unit, safety-critical data may not be read out or modified in particular by third parties or by attackers. In particular, a cryptographic operation is executed as safety-critical function.

A cyber-physical system (CPS) is a system of various informatic, software-related, hardware-related, mechanical, and/or electronic components, for example embedded systems, logistics processes, coordination processes, and management processes, Internet services, etc. A cyber-physical system acquires physical data, in particular using sensors, processes these data, and based thereon acts on physical processes via actuators. The components of a cyber-physical system are in communicative connection with one another, for example via the Internet. In particular, the components can use data and services that are available worldwide. Cyber-physical systems have in particular multi-modal human-machine interfaces.

Conventional embedded systems are in particular to be distinguished from cyber-physical systems. A cyber-physical system is in particular an open sociotechnical system, and enables functions, services, and properties that go beyond the capacities of conventional embedded systems having controlled behavior. Examples of cyber-physical systems include IT traffic control and traffic logistics systems, networked safety and driver assistance systems for motor vehicles, industrial process control and automation systems, environmental influence and observation systems, energy supply management systems, military system networking systems, infrastructure systems for communication and culture, medical devices and systems, and assistance systems adapted to older persons (Ambient Assisted Living, or AAL).

An example method in accordance with the present invention makes it possible to limit, restrict, and secure access to the safety-critical function. Access is authorized only if specific conditions in the environment of the computing unit, and/or the behavior of the user, correspond to the specified criteria. In particular, the safety-critical function can be executed only in an environment provided specifically therefor, and/or only by authorized persons. In this way, unauthorized sources or attackers can be prevented from gaining unpermitted access to the safety-critical function and its results. The safety of the computing unit and of the cyber-physical system can be increased in a simple manner.

In particular, the example method prevents large-scale attacks on the cyber-physical system. A remote attack on the safety-critical function, for example if an attacker gains access to the computing unit via the Internet, is prevented by the method, because attackers cannot manipulate measurement values from a distance.

Attacks coming from the immediate vicinity can also be prevented, because for the most part, due to stringent safety precautions, it is not possible for an attacker to come close enough to the computing unit to manipulate measurement values, for example if the cyber-physical system is integrated into a motor vehicle, an industrial machine, or an installation.

The method can be integrated into existing cyber-physical systems easily and at low cost. The computing unit for the most part already has sensors that can be used for the method. The sensors can nonetheless continue to be used for the regular operation of the computing unit. Retrofitting is not required.

Advantageously, the specified criterion describes a specific manner in which the user interacts with the computing unit. The execution of the safety-critical function is authorized only if the user actually physically interacts with the computing unit, and if the user knows the specific interaction with the computing unit for the authorization of the execution of the safety-critical function.

Preferably, the criterion describes whether the user is holding the computing unit in the hand. For example, for this purpose the temperature of the computing unit, and/or an electrical resistance, can be acquired as measurement values. If these measurement values exceed a respective boundary value that is reached only if the user is holding the computing unit in the hand, the safety-critical function is executed.

Alternatively or in addition, the criterion preferably describes whether the user has physical contact with the computing unit, and/or whether the user is situated in a specific region around the computing unit. For example, for this purpose ultrasound or infrared measurements of the specific region can be carried out, and corresponding measurement values can be acquired.

The criterion can advantageously also describe whether the user is carrying out a specific movement, for example whether the user is making a specific gesture, hand movement, or arm movement, or whether the user is moving the computing unit in a specific manner. For example, for this purpose acceleration sensors can be provided that determine a movement of the computing unit. The criterion can for example also describe whether the user has inputted a correct PIN or code. Using suitable sensors, a facial recognition and/or fingerprint recognition of the user can also be carried out.

Advantageously, the specified criterion describes whether the computing unit is situated in a specific environment, whether specific further computing units or components of the cyber-physical system are connected to the computing unit, and/or whether specific further computing units or components of the cyber-physical system are situated in a specific region around the computing unit. In this way, the safety-critical function is prevented from being executed if an attacker has wrongfully obtained access to the computing unit and has unlawfully stolen it.

According to a preferred specific embodiment, it is checked whether the acquired environment-specific and/or user-specific measurement value fulfills the specified criterion. In this case, the acquired measurement value and the received request represent two separate, independent input quantities. In order to evaluate whether the function is executed, these two input quantities are evaluated independently of one another. The received request is, for example, permitted only if the measurement value fulfills the specified criterion. Preferably the execution of the function is permitted only if this permitted request is a valid request. In particular, an appropriate control logic is provided that evaluates the acquired measurement values and permits or blocks the received request.

According to a further preferred specific embodiment, from the received request and from the acquired environment-specific and/or user-specific measurement value an expanded request is created for executing the safety-critical function. The acquired measurement value and received request are in this case not evaluated separately and independently of one another, but rather are combined to form a higher-order input quantity. In this case, the expanded request is the actual request that is evaluated for the execution of the safety-critical function. The safety-critical function is preferably executed only if the validity of the expanded request is recognized. This validity is preferably a function of the specified criterion. The expanded request is in particular evaluated according to separate validity criteria that are a function of whether the received request is valid in itself and whether the acquired measurement values fulfill the respective criterion. In particular, upon reception of the request an appropriate function is executed in order to create the expanded request.

A combination of these two preferred specific embodiments is also possible. From the received request and from the acquired measurement value, advantageously the expanded request is created, which preferably is permitted only if the acquired measurement value fulfills the specified criterion. In addition, it is in particular checked whether the validity of the expanded request is recognized. The acquired measurement value thus has to fulfill the criterion so that on the one hand a valid expanded request can be produced, and so that on the other hand the expanded request will be permitted. The safety-critical function can in this way be doubly secured.

Preferably, different measurement values are used for the expanded request and for the check whether the expanded request is permitted. For this purpose, preferably a first and a second environment-specific and/or user-specific measurement value are acquired using the sensors of the computing unit. The expanded request is created from the request and the first measurement value. The expanded request is permitted if the second acquired measurement value fulfills the specified criterion. The safety-critical function is executed if the expanded request is permitted and if the validity of the expanded request is recognized. The use of two different measurement values offers additional safety and additional security against attacks.

It is also possible to acquire a plurality of different first or a plurality of different second environment-specific and/or user-specific measurement values. From the request and these different first measurement values, the expanded request is produced that in particular is permitted only if each of the different second measurement values respectively fulfills a specified criterion, or if in particular all these second measurement values fulfill a common specified criterion.

Advantageously, a physical unclonable function (PUF) is executed as safety-critical function. PUFs are functions based on physical characteristics of the computing unit on which they are executed. A PUF evaluates manufacturing-based fluctuations of the computing unit and produces an individual signal therefrom. This individual signal varies strongly among different computing units, and can be used in general to authenticate the computing unit or to create (cryptographic) keys. A PUF can be executed in the computing unit with a comparatively low computing expense and at low energy, and no additional hardware is required.

Examples of PUFs are silicon physical random functions (SPUF), which evaluate variations in the delay of transistors and lines in integrated circuits in order to identify the chip. Arbiter PUFs use an arbiter (e.g., a D flip-flop) to recognize differences in two identical delay blocks. In a coating PUF, local resistances of a coating of an integrated circuit are acquired and evaluated in order to identify the chip.

In attacks on conventional cyber-physical systems, an attacker reads out all the possible requests to the PUF and the corresponding results, or responses, of the PUF to these requests. If all the requests and the corresponding responses are known to the attacker, the attacker can imitate the PUF and can pretend to be a component of the cyber-physical system. The method for executing a safety-critical function prevents such attacks. Even if all the requests and responses of the PUF were known to an attacker, the attacker would not be able to pretend to be a component of the cyber-physical system, because it is not possible for the attacker to influence measurement values.

Preferably, the computing unit is used in an "Internet of things." The Internet of things represents a linkage of uniquely identifiable physical objects (things) with a virtual representation in the Internet, or in a structure similar to the Internet. Objects are automatically identified for example by RFID. Physical states can be acquired, and actions carried out, using sensors and actuators.

An example a computing unit according to the present invention is set up, in particular in terms of programming, to carry out a method according to the present invention. The present invention is suitable for appropriate computing units that can be integrated in a cyber-physical system. For example, the computing unit can be fashioned as an electrical or electronic microsystem, for example as a system-on-a-chip (one-chip system; SoC) or a micro-electromechanical system (MEMS). The computing unit can also be fashioned as a device that can have a large number of such microsystems. For example, the computing unit is fashioned as a control unit of a motor vehicle, a machine, or an installation. The computing unit can also be fashioned as a portable handheld device, in particular a portable touchscreen handheld device, for example a smartphone or tablet PC.

The implementation of the method in the form of a computer program is also advantageous because this results in particularly low costs, in particular if an executing control device is also used for other tasks and is therefore already present. Suitable data carriers for providing the computer program are in particular magnetic, optical, and electrical memories, such as hard drives, flash memories, EEPROMs, DVDs, and others. Downloading of a program via computer networks (Internet, intranet, etc.) is also possible.

Further advantages and embodiments of the present invention are described below and are shown in the figures.

The present invention is shown schematically in the figures on the basis of exemplary embodiments, and is described below with reference to the figures.

DETAILED DESCRIPTION OF EXAMPLE EMBODIMENTS

Figure 1:
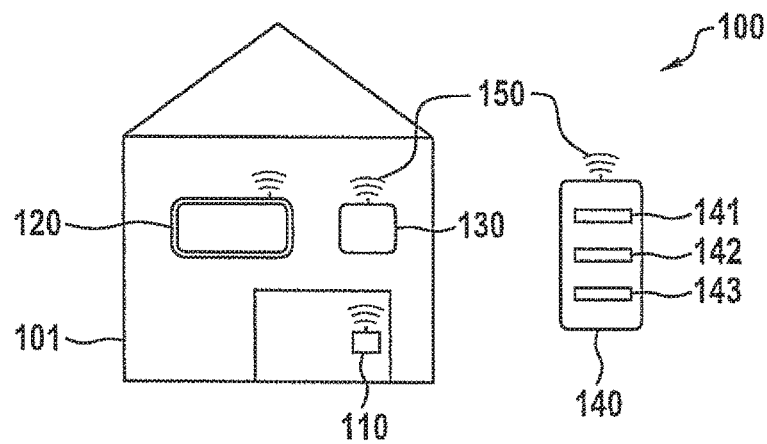
FIG. 1 schematically shows a cyber-physical system having a computing unit fashioned as a smartphone, set up to carry out a preferred specific embodiment of a method according to the present invention.

FIG. 1 schematically shows a second example of a cyber-physical system in the form of an "intelligent house," designated 100. Various components or devices of this "intelligent house" are networked in the context of a house automation or "intelligent living."

For example, this cyber-physical system 100 has an electric door lock 110 of a house door of the house 101, a television 120, and an air-conditioning system 130. These three components are in most cases always situated in house 101. Cyber-physical system 100 has in addition a smartphone 140 that the occupant usually also carries on his/her person outside house 101. These components 110, 120, 130, and 140 of cyber-physical system 100 are networked with one another by a wireless communication connection 150, for example via WLAN or the Internet.

In this example smartphone 140 represents a preferred embodiment of a computing unit according to the present invention that is set up to carry out a preferred specific embodiment of a method according to the present invention.

For example, if the occupant wishes to enter house 101, the occupant opens electric house door lock 110 using smartphone 140. For this purpose, a request is communicated from house door lock 110 to smartphone 140 for the execution of a safety-critical function. For example, upon receiving the request smartphone 140 is to execute a physical unclonable function PUF in order to create a cryptographic key for the communication between smartphone 140 and house door lock 110.

After this request has been received by smartphone 140, smartphone 140 acquires environment-specific and/or user-specific measurement values using sensors 141, 142, and 143. For example, a temperature sensor 141, acceleration sensors 142, and a GPS sensor 143 are provided in order to acquire the temperature or a movement of smartphone 140 and to acquire its current GPS coordinates as measurement values.

The PUF is executed only if these measurement values fulfill a specified criterion that preferably describes the environment of smartphone 140, and further preferably describes a specific manner in which the occupant interacts with smartphone 140. For example, as criterion it is checked whether the temperature of smartphone 140 exceeds a threshold value that is in particular exceeded only if the occupant is holding smartphone 140 in the hand. In addition, it is checked whether the occupant is moving smartphone 140 in a particular manner, for example whether the occupant is shaking smartphone 140. In addition, on the basis of the current GPS coordinates, it is checked whether smartphone 140 is situated in a specific region of for example 10 meters around house door lock 110.

The PUF is executed only if the occupant is holding smartphone 140 in the hand, is appropriately shaking it, and is situated within 10 meters around house 101. Only then does the PUF create the cryptographic key, smartphone 140 and house door lock 110 are able to communicate with one another, and the house door can be unlocked. In this way, attacks on the smartphone can be prevented, for example if an attacker has gained access to smartphone 140 via the Internet. Such an attack is not possible because the attacker is neither holding smartphone 140 in the hand, nor is carrying out the specific movement, nor is situated within 10 meters around house 101.

Figure 2:
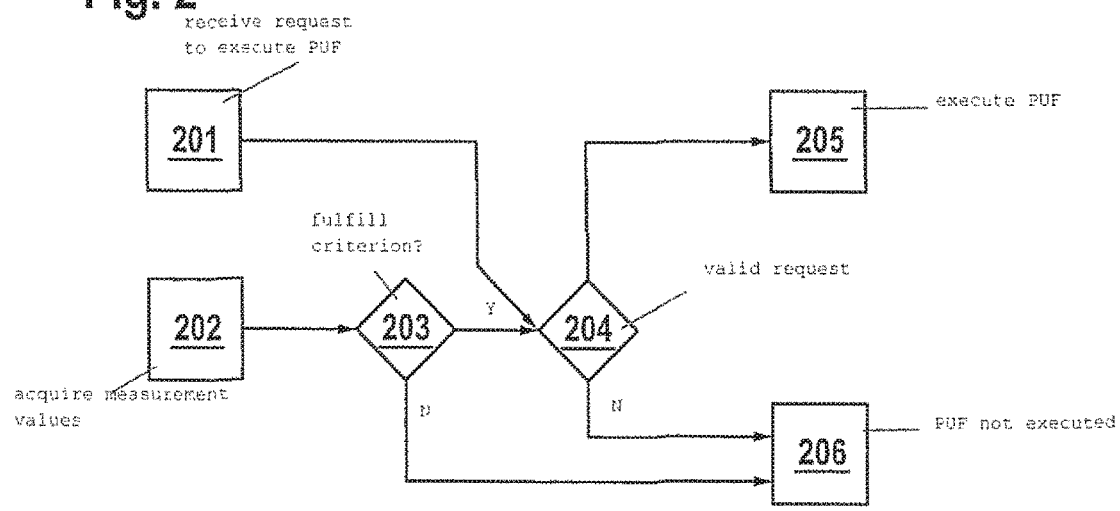
FIG. 2 schematically shows a first preferred specific embodiment of a method according to the present invention as a block diagram.

In FIG. 2, a first preferred specific embodiment of the method according to the present invention is shown schematically as a block diagram.

In step 201, smartphone 140 receives the request to execute the PUF. At the same time, in step 202 the respective measurement values are acquired by sensors 141, 142, and 143.

In step 203 it is checked whether the measurement values acquired in step 202 fulfill the specified criterion. If this is the case, the request received in step 201 is permitted. In this case, in step 204 it is evaluated whether the received request is a valid request. If this is the case, then the PUF is executed in step 205.

If the acquired measurement values in step 203 do not fulfill the criterion, or if the request in step 204 is not permitted, then according to step 206 the PUF is not executed. In particular, in smartphone 140 an appropriate control logic is provided to carry out the evaluations according to step 203 and 204.

Figure 3:
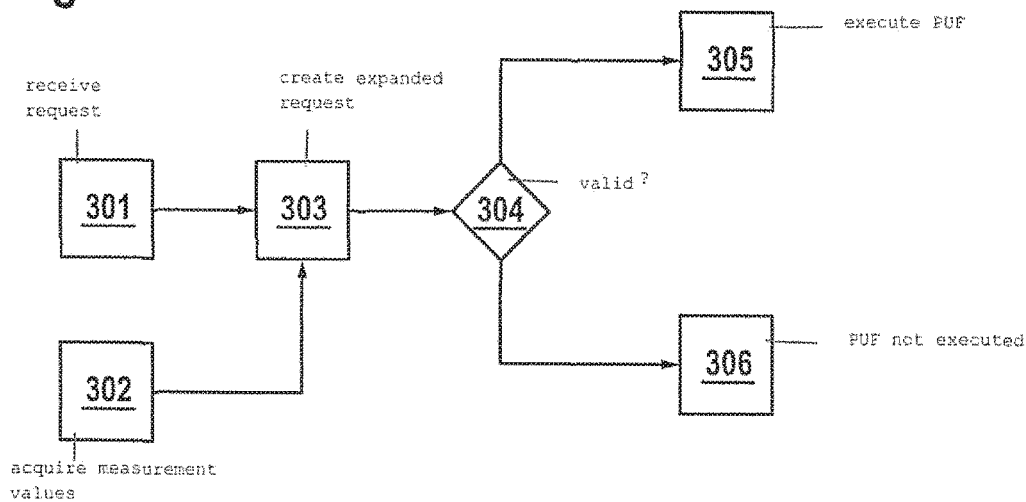
FIG. 3 schematically shows a further preferred specific embodiment of a method according to the present invention as a block diagram.

In FIG. 3, a second preferred specific embodiment of the method according to the present invention is shown as a block diagram.

Analogous to step 201 and 202, in step 301 the request is received and in step 302 the measurement values are acquired. From this request and the measurement values, in step 303 an expanded request is created. For this purpose, smartphone 140 executes an appropriate function or operation.

In step 304, the validity of this expanded request is checked. This validity is a function of whether the request received in step 301 is valid and whether the measurement values acquired in step 302 fulfill the criterion. If the validity of the expanded request is recognized, the PUF is executed in step 305; otherwise the execution of the PUF is prevented according to step 306.

Figure 4:
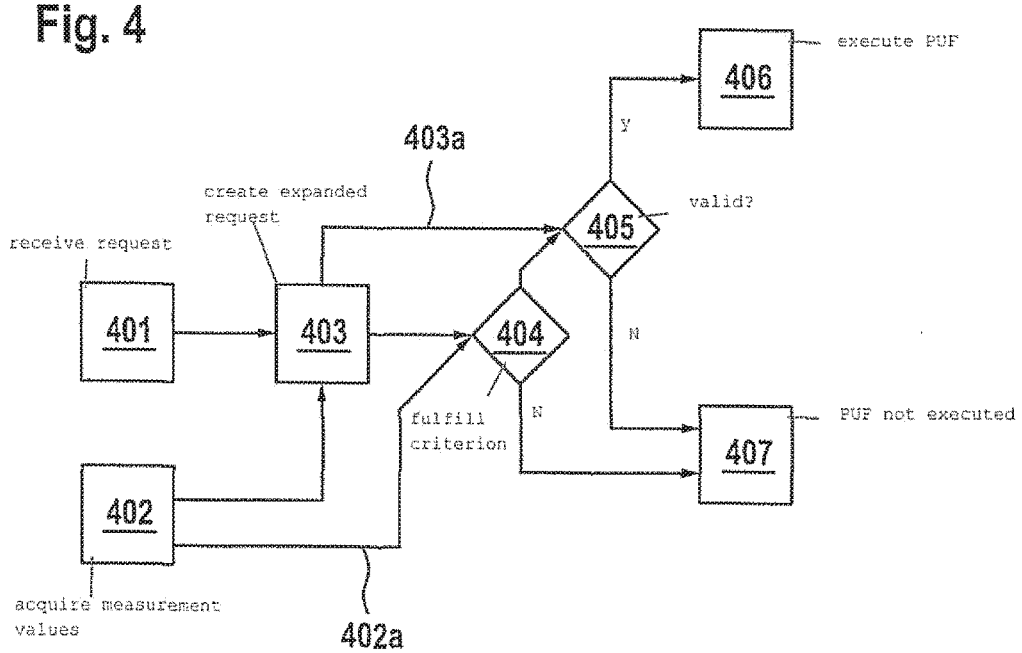
FIG. 4 schematically shows a further preferred specific embodiment of a method according to the present invention as a block diagram.

A further preferred specific embodiment of the method according to the present invention, shown schematically in FIG. 4 as a block diagram, is a combination of the first and second specific embodiments.

Analogous to the steps 301, 302, and 303, in step 401 the request is received, in step 402 the measurement values are acquired, and in step 403 the expanded request is created. In step 404, analogous to step 203, it is checked whether the measurement values acquired in step 402 fulfill the specified criterion (indicated by reference character 402a).

If this is the case, the expanded request created in step 403 is permitted. In this case, in step 405, analogous to step 304, the validity of this expanded request is checked (indicated by reference character 403a). If the validity of the expanded request is recognized, then the PUF is executed in step 406.

If the validity is not recognized in step 405, or if the measurement values in step 404 do not fulfill the criterion, then the execution of the PUF is prevented according to step 407.

Figure 5:
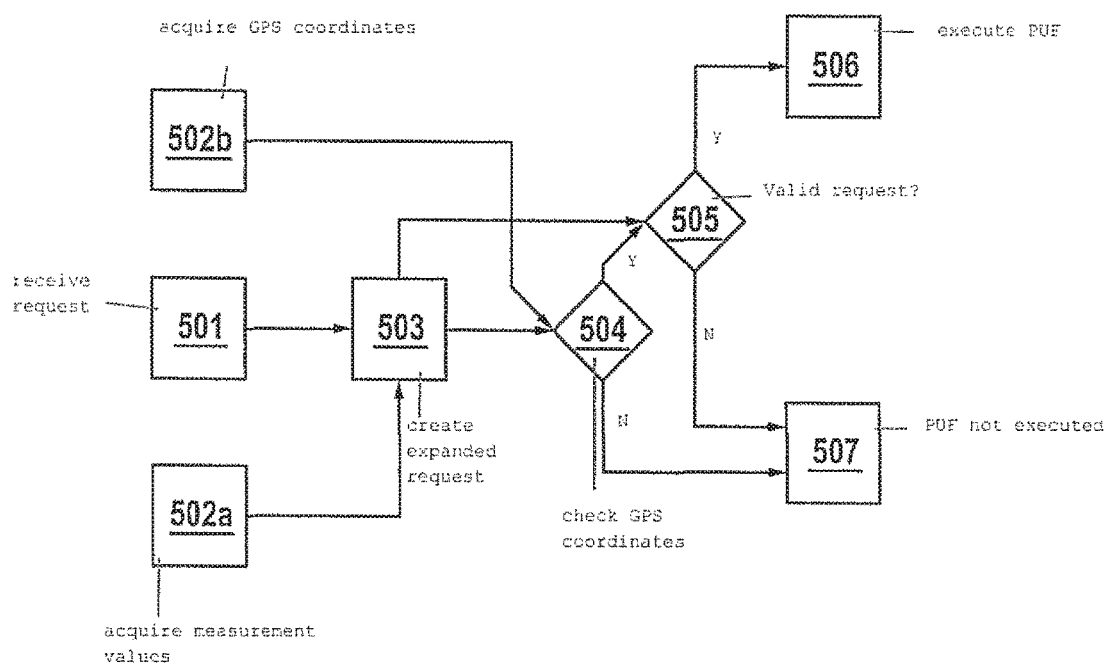
FIG. 5 schematically shows a further preferred specific embodiment of a method according to the present invention as a block diagram.

A further preferred specific embodiment of the method according to the present invention is shown schematically in FIG. 5 as a block diagram.

In step 501, the request is received. In step 502a, first environment-specific and/or user-specific measurement values of smartphone 140 are acquired, e.g., the temperature and the movement of smartphone 140. In step 503, the expanded request is created from the request and these first measurement values.

In step 502a, the current GPS coordinates of the smartphone are acquired as second environment-specific and/or user-specific measurement values. In step 504, these current GPS coordinates are checked to see whether the smartphone is situated within 10 meters around house 101. If this is the case, the expanded request is permitted.

In this case, in step 505 the validity of this expanded request is checked. In this case, the validity is a function of whether the temperature required in step 502a has reached the threshold value, and whether the movement acquired in step 502a corresponds to a shaking of smartphone 140.

If the validity of the expanded request is recognized, in step 506 the PUF is executed. If the validity is not recognized, or if smartphone 140 is not situated within 10 meters around house 101, the execution of the PUF is prevented according to step 507.

What is claimed is:

1. A method for executing a safety-critical function of a computing unit in a cyber-physical system, the method comprising:

receiving a request by a first computing unit in the cyber-physical system from a second computing unit, separate from the first computing unit, for an execution of the a safety-critical function at the first computing unit, the safety-critical function being a cryptographic operation;

acquiring at least one of an environment-specific measurement value and a user-specific measurement value by at least one sensor of the first computing unit, the environment-specific measurement value describing an environment of the first computing unit, the user-specific measurement value describing an interaction of a user with the first computing unit;

determining, by the first computing unit, whether the acquired at least one of the environment-specific measurement value and the user user-specific measurement value fulfills a specified criterion, wherein the specified criterion describe a specific manner in which the user interacts with the first computing unit;

in response to the determination that the values fulfills the specified criterion, executing, by the first computing unit, a physical unclonable function as the safety-critical function;

generating a cryptographic key by the physical unclonable function; and encrypting communication between the first computing unit and second computing unit using the generated cryptographic key.

2. The method as recited in claim 1, wherein the specified criterion describes a specific manner in which a user interacts with the first computing unit.

3. The method as recited in claim 2, wherein the specified criterion describes at least one of: whether the user is holding the first computing unit in a hand, whether the user has physical contact with the first computing unit, whether the user is situated in a specific region around the first computing unit, and whether the user is carrying out a specific movement.

4. The method as recited in claim 1, wherein the specified criterion describes at least one of whether the first computing unit is situated in a specific environment, whether specific further computing units stand in connection with the first computing unit, and whether specific further computing devices are situated in a specific region around the first computing unit.

5. The method as recited in claim 1, wherein the at least one sensor includes a temperature sensor, wherein the at least one of an environment-specific measurement value and a user-specific measurement value includes a temperature of the first computing unit measured using the temperature sensor, and wherein the determining includes ascertaining whether the measured temperature exceeds a threshold value, the threshold value being exceeded only when a user is holding the first computing unit.

6. The method as recited in claim 1, further comprising:
creating an expanded request for the execution of the safety-critical function from the received request and from the at least one of the acquired environment-specific value and the user-specific measurement value; and
executing the safety-critical function if a validity of the expanded request is recognized, the validity of the expanded request being a function of the specified criterion.

7. The method as recited in claim 6, wherein the expanded request for the execution of the safety-critical function is created from the received request and from the at least one of the acquired environment-specific measurement value and the user-specific measurement value, and the method further comprises:
checking whether the at least one of its acquired environment-specific and the user-specific measurement value fulfills the specified criterion;
permitting the created expanded request if at least one of the acquired environment-specific measurement value and the user-specific measurement value fulfills the specified criterion; and
executing the safety-critical function if the created expanded request is permitted and if the validity of the expanded request is recognized.

8. The method as recited in claim 7, further comprising:
acquiring at least one of a first environment-specific measurement value and a first user-specific measurement value and at least one of a second environment-specific measurement value and a second user-specific measurement value by the at least one sensor of the first computing unit;
creating the expanded request for executing the safety-critical function from the received request and from the at least one of the first acquired environment-specific measurement value and its first user-specific measurement value;
checking whether the at least one of the second acquired environment-specific measurement value and the second user-specific measurement value fulfills the specified criterion;
permitting the created expanded request if the at least one of the second acquired environment-specific and the second user-specific measurement value fulfills the specified criterion; and
executing the safety-critical function if the created expanded request is permitted and if the validity of the expanded request is recognized.

9. The method as recited in claim 1, wherein the first computing unit wirelessly receives the request from the second computing unit using a wireless communication network.

10. The method as recited claim 1, wherein the first computing unit is used in an Internet of things.

11. A first computing unit for executing a safety-critical function of a computing unit in a cyber-physical system, the first computing unit comprising:
an electronic microsystem; and
a plurality of sensors;
the electronic microsystem is configured to:
receive a request from a second computing unit, separate from the first computing unit, for an execution of the a safety-critical function at the first computing unit, wherein the safety-critical function is a cryptographic operation;
acquire at least one of an environment-specific measurement value and a user-specific measurement value by at least one sensor of the first computing unit, the environment-specific measurement value describing an environment of the first computing unit, the user-specific measurement value describing an interaction of a user with the first computing unit;
determine whether the acquired at least one of the environment-specific measurement value and the user user-specific measurement value fulfills a specified criterion, wherein the specified criterion describe a specific manner in which the user interacts with the first computing unit;
execute the safety-critical function based on results of the determination;
in response to the determination that the values fulfills the specified criterion, execute a physical unclonable function as the safety-critical function;
generate a cryptographic key using the physical unclonable function; and
encrypt communication between the first computing unit and second computing unit using the generated cryptographic key.

12. The first computing unit as recited in claim 11, wherein the at least one sensor includes a temperature sensor, wherein the at least one of an environment-specific measurement value and a user-specific measurement value includes a temperature of the first computing unit measured using the temperature sensor, and wherein the determination includes ascertaining whether the measured temperature exceeds a threshold value, the threshold value being exceeded only when a user is holding the first computing unit.

13. The first computing unit as recited in claim 11, wherein the first computing unit wirelessly receives the request from the second computing unit using a wireless communication network.

14. A non-transitory machine-readable storage medium storing a computer program for executing a safety-critical function of a first computing unit in a cyber-physical system, the computer program, when executed by the first computing unit, causing the computing unit to perform:
receiving a request by a first computing unit in the cyber-physical system from a second computing unit, separate from the first computing unit, for an execution of the a safety-critical function at the first computing unit, the safety-critical function being a cryptographic operation:
acquiring at least one of an environment-specific measurement value and a user-specific measurement value by at least one sensor of the first computing unit, the environment-specific measurement value describing an environment of the first computing unit, the user-specific measurement value describing an interaction of a user with the first computing unit;
determining, by the first computing unit, whether the acquired at least one of the environment-specific measurement value and the user user-specific measurement value fulfills a specified criterion, wherein the specified criterion describe a specific manner in which the user interacts with the first computing unit;

in response to the determination that the values fulfills the specified criterion, executing, by the first computing unit, a physical unclonable function as the safety-critical function;
generating a cryptographic key by the physical unclonable function; and
encrypting communication between the first computing unit and second computing unit using the generated cryptographic key.

15. The non-transitory machine-readable storage medium as recited in claim 14, wherein the at least one sensor includes a temperature sensor, wherein the at least one of an environment-specific measurement value and a user-specific measurement value includes a temperature of the first computing unit measured using the temperature sensor, and wherein the determining includes ascertaining whether the measured temperature exceeds a threshold value, the threshold value being exceeded only when a user is holding the first computing unit.

16. The non-transitory machine-readable storage medium as recited in claim 14, wherein the first computing unit wirelessly receives the request from the second computing unit using a wireless communication network.

* * * * *